United States Patent [19]

DeLuca et al.

[11] 4,070,598

[45] Jan. 24, 1978

[54] FLUORESCENT LAMP WITH SECOND PHOSPHOR LAYER

[75] Inventors: John A. DeLuca; William W. Piper, both of Scotia, N.Y.

[73] Assignee: General Electric Co., Schenectady, N.Y.

[21] Appl. No.: 739,749

[22] Filed: Nov. 8, 1976

[51] Int. Cl.[2] .................. H01J 61/44; H01J 61/48
[52] U.S. Cl. ..................... 313/487; 252/301.4 H
[58] Field of Search .................. 313/487, 486; 252/301.4 R, 301.4 H

[56] References Cited

U.S. PATENT DOCUMENTS

| 3,484,381 | 12/1969 | Yale et al. | 252/301.4 R |
| 3,602,757 | 8/1971 | Wachtel | 313/487 |
| 3,909,657 | 9/1975 | Brown | 313/487 |

FOREIGN PATENT DOCUMENTS

| 2,509,931 | 9/1975 | Germany | 313/487 |
| 474,907 | 11/1937 | United Kingdom | 313/487 |

Primary Examiner—Palmer C. Demeo
Attorney, Agent, or Firm—Geoffrey H. Krauss; Joseph T. Cohen; Jerome C. Squillaro

[57] ABSTRACT

A fluorescent lamp having a phosphor layer for converting radiation at a first non-visible wavelength to radiation in the visible spectrum, includes a second phosphor layer for converting other non-visible radiation, having a deleterious effect (depreciation) on the first phosphor layer, to wavelengths in the region containing the first wavelength for subsequent conversion to visible light, thus increasing the brightness of the fluorescent lamp simultaneous with minimization of early depreciation of lamp brightness.

6 Claims, 2 Drawing Figures

FLUORESCENT LAMP WITH SECOND PHOSPHOR LAYER

BACKGROUND OF THE INVENTION

The present invention relates to fluorescent lamps and, more particularly, to a novel two-phosphor-layer fluorescent lamp utilizing a second layer of a phosphor having a high quantum efficiency for increased brightness and minimized brightness depreciation.

A typical fluorescent lamp comprises an envelope of material transparent to visible light; a quantity of mercury vapor contained in the envelope and caused, via electrical discharge and the like mechanisms, to emit radiation at wavelengths predominantly in the ultraviolet region; and a layer of phosphor deposited upon the interior surface of the envelope for converting the ultraviolet radiation to radiation in the visible portion of the electromagnetic spectrum. Typical phosphors, such as the calcium halophosphates utilized to achieve visible light having a standard "cool white" color point, convert ultraviolet radiation having wavelengths in the region about 254 nanometer (nm.) to visible radiation; other mercury-emitted radiation at 185 nm. is not converted to visible light by the phosphor, and also has been observed to depreciate the visible light conversion output of the phosphor by as much as 10% in the first few minutes of operation. A fluorescent lamp capable of utilizing the 185 nm. mercury vapor radiation, while substantially reducing the depreciation in halophosphate phosphor efficacy (presently experienced), is therefore extremely desirable.

BRIEF SUMMARY OF THE INVENTION

In accordance with the invention, a fluorescent lamp converting at least a portion of the mercury emission at about 185 nm. to visible light and reducing halophosphate depreciation, comprises envelope means transmitting light of visible wavelengths; a quantity of mercury vapor contained in the envelope means and emitting radiation at a plurality of non-visible wavelengths; a first layer of a phosphor, deposited upon the interior surface of the envelope means, for converting at least one of the wavelengths of the mercury emission to visible light; and a second layer of a phosphor, deposited upon interior surface of the first phosphor layer, for converting another mercury radiation wavelength, capable of causing a depreciation in the conversion efficiency of the material of the first phosphor layer, to quanta of radiation having wavelengths in the region containing the first wavelength, for conversion by said first phosphor layer to visible light. Thus, the potentially deleterious shorter-wavelength (185 nm.) radiation is absorbed in the second (inner) layer and is substantially prevented from reaching the first phosphor layer. The absorbed radiation is converted, with high quantum efficiency, to radiation at the wavelengths, in the region about the 254 nm. resonance wavelength of the excited mercury vapor, which are readily received and converted to visible light by the first (halophosphate) phosphor layer.

Preferably, the second, or innermost, phosphor layer is formed of a trivalent praseodymium-activated lithium yttrium tetrafluoride phosphor ($LiYF_4:Pr^{3+}$), wherein the activating praseodymium ions are present in a preferred concentration of about 1%, to absorb about 90% of the incident mercury-vapor radiation of 185 nm. for conversion with a quantum efficiency of about 95% to radiation in four ultraviolet bands having wavelengths of about 220 nm., about 230 nm., about 246 nm. and about 254 nm. The preferred second phosphor material has a high transparency at 254 nm., when applied at a preferred density of about 3 to about 4 milligrams per square centimeter, and substantially equal to the reflectance (at 254 nm.) of the well-known standard, $BaSO_4$. Substantially no reduction in this reflectance occurs in the critical first hour (under normal loading) of lamp operation.

Accordingly, it is one object of the present invention to provide a novel two-layer fluorescent lamp having a relatively high resistance to depreciation of luminous efficacy.

These and other objects of the present invention will become apparent upon a consideration of the following detailed description and the drawings.

DETAILED DESCRIPTION OF THE INVENTION

Figure 1:
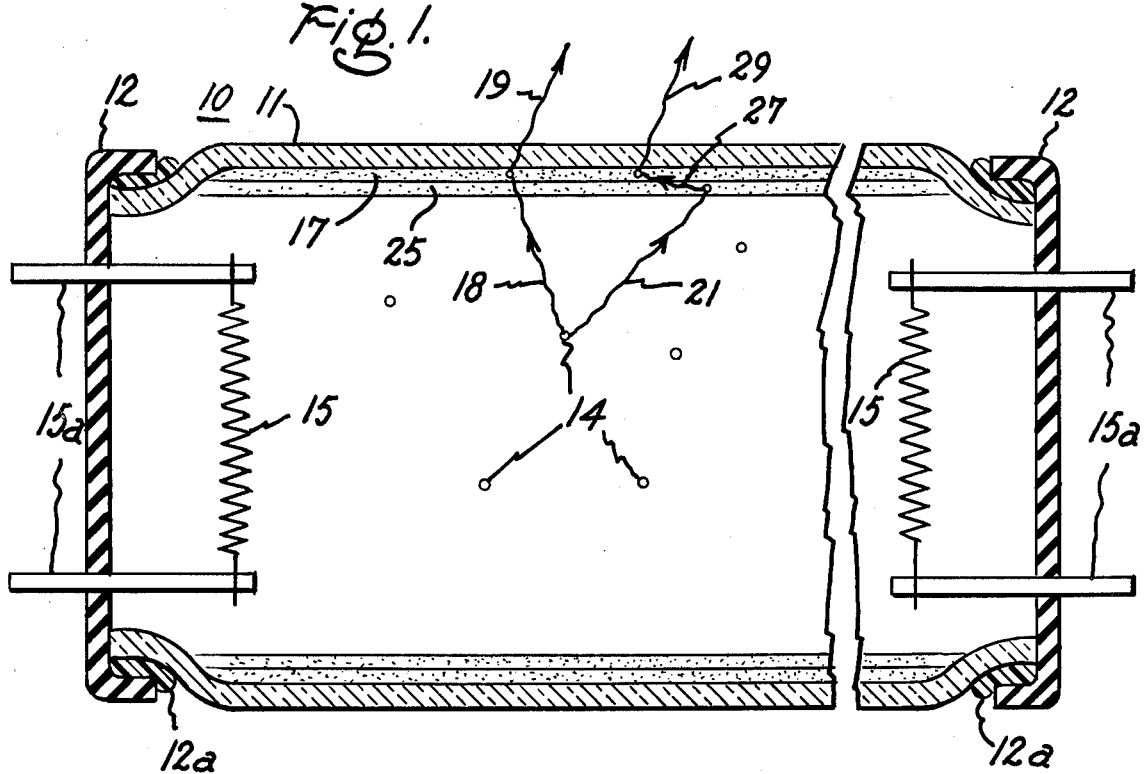
FIG. 1 is a sectional side view of a novel two-layer fluorescent lamp in accordance with the principles of the present invention.

Referring initially to FIG. 1, a fluorescent lamp 10 comprises an envelope means 11, such as an annular cylinder formed of glass and the like materials, having relatively low attenuation of radiation at least of visible wavelengths. An end-cap means 12 is sealed across each open end of envelope means 11, as at edge 12a to provide a substantially gas-tight enclosure of a quantity of mercury vapor 14. Each end-cap 12 supports means, such as a filament 15 having its leads 15a passing through the associated end-cap 12 for external connection, which means are adapted to cause (when lamp 10 is coupled to a source of electrical energy and suitable components external thereto and not shown for reasons of simplicity) an electrical discharge through mercury vapor 14. Responsive to the discharge, the mercury vapor emits radiation having wavelengths primarily in the ultraviolet region of the electromagnetic spectrum; the radiation components having the greatest magnitudes of energy have respective wavelengths of about 254 nm. and about 185 nm.

The interior wall of envelope 11 is coated with a first layer 17 of a phosphor selected to absorb the 254 nm. radiation 18, emitted by mercury vapor 14, and convert this ultraviolet (and hence invisible) wavelength to radiation 19 having wavelengths in the visible region. Visible radiation 19 is transmitted from phosphor layer 17 through the transmissive envelope 11 to illuminate space surrounding lamp 10. The particular phosphor selected for first layer 17 is dependent upon the color characteristics of the visible radiation 19 emitted by the lamp; illustrative, a so-called "cool white" spectral power distribution may be achieved with first phosphor layer 17 consisting essentially of a halophosphate material, typically a calcium halophosphate activated with antimony and manganese.

The phosphors typically utilized for first phosphor layer 17 generally experience a depreciation of luminous efficacy on the order of about 10% in the first few minutes of lamp operation, due to radiation damage occurring in the phosphor responsive to exposure to the 185 nm. radiation 21 emitted from mercury vapor 14, typically with about one-seventh as much energy as the desired 254 nm. mercury-discharge radiation.

We have found that the 185 nm. radiation may be substantially prevented from impinging upon first phosphor layer 17, but still be utilized to increase the overall luminous output of the lamp, by providing a second phosphor layer 25 fabricated upon the interior surface of first phosphor layer 17. The phosphor material utilized for second layer 25 must absorb a significant portion of incident 185 nm. radiation (to prevent transmission of this radiation to first phosphor layer 17) and must, advantageously, re-radiate energy 27 at longer-ultraviolet wavelengths (in the range of about 220 to about 260 nm.) for conversion within first phosphor layer 17 to additional radiation 29 having visible wavelengths. The total absorption of 185 nm. wavelength radiation 21 will provide about 2.5% improvement in brightness, as one consequence of eliminating early depreciation of phosphor layer 17 thereby, while the additional radiation 27 supplied to first phosphor layer 17 may, depending upon the absorption ratio (of the 185 nm. radiation) and the quantum efficiency in conversion of 185 nm. radiation to radiation in the aforementioned near-ultraviolet wavelength by second phosphor layer 25, improve the visible light output of lamp 10 by up to 15% (assuming total absorption of 185 nm. radiation and 100% conversion quantum efficiency).

Figure 2:
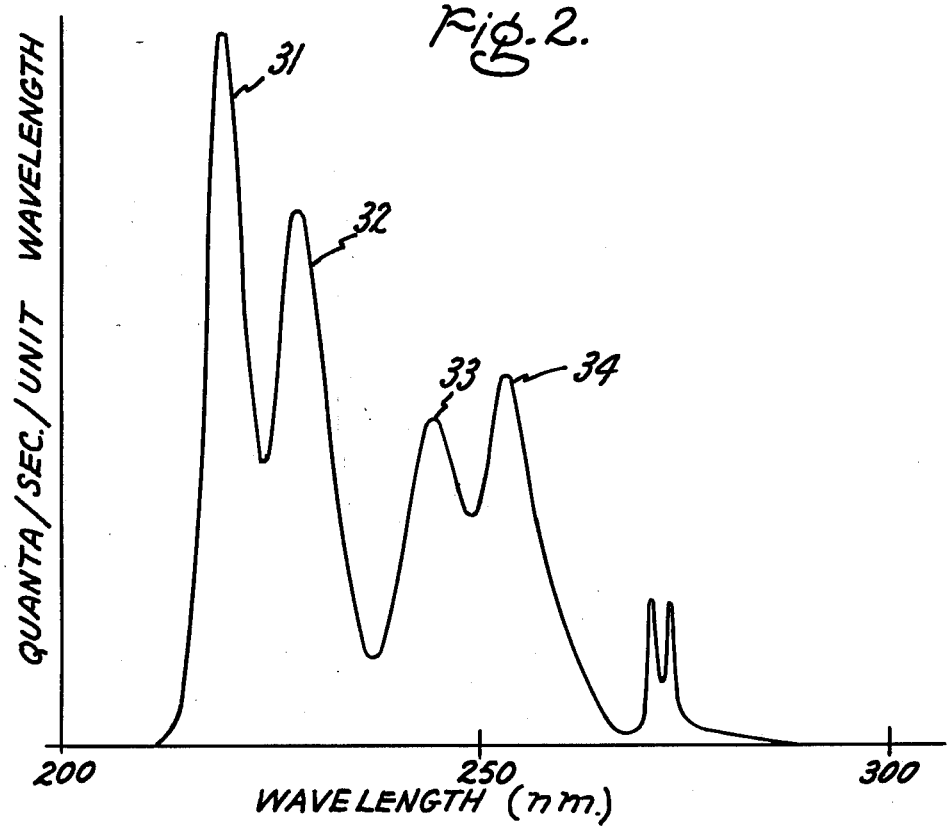
FIG. 2 is a graph illustrating the fluorescence output of a preferred second-layer phosphor responsive to incident 185 nm. radiation.

We have found that a preferred phosphor for use in second phosphor layer 25 is a lithium-yttrium tetrafluoride ($LiYF_4$) host activated with trivalent praseodymium ($Pr^{3+}$), preferably with a concentration of about 1% $Pr^{3+}$. The preferred $LiYF_4$:1%$Pr^{3+}$ absorbs about 90% of the 185 nm. radiation incident thereon and converts the same (FIG. 2) to fluorescence in four ultraviolet bands, 31–34, centered at about 220 nm. (band 31), about 230 nm. (band 32), about 246 nm. (band 33) and about 254 nm. (band 34) with a conversion quantum efficiency of about 95%. The reflectance of the $LiYF_4$:Pr phosphor, at 254 nm. has been measured to be on the order of 93%, initially, and about 89% after a 1 hour exposure to the mercury discharge. This reflectance compares favorably with the reflectance of the standard, barium sulphate ($BaSO_4$) which has a reflectance on the order of 94% when measured in a "deep dish" sample utilizing a pressed powder at least 1 millimeter thick. Thus, the preferred praseodymium activated $LiYF_4$ phosphor has very good transparency at the 254 nm. wavelength of interest, whereby the initial radiation 18 (at 254 nm.) is substantially transmitted through the second phosphor layer 25 for absorption by first phosphor layer 17 and subsequent conversion to visible light; the re-radiated 220–260 nm. radiation 27, from second phosphor layer 25, will also be transmitted to first phosphor layer 17 without substantial dissipation in the originating second phosphor layer. Further, the preferred praseodymium-activated phosphor, when applied as a layer having a density on the order of 3–5 milligrams per square centimeter (over an NT layer of standard thickness) exhibits a better resistance to mercury-discharge depreciation than does the standard "cool white" (NT) halophosphates; this increased resistance is typically on the order of about 5% better. Typically, after operation for periods of between ½–1 hour, under normal loading, the phosphors transparency at 254 nm. is typically reduced less than 5%.

The phosphor is prepared by firing a stoichiometric mixture of lithium fluoride (LiF) and trivalent-praseodymium-activated yttrium trifluoride ($YF_3$:$Pr^{3+}$) powders at a temperature on the order of 750° C in a hydrogen fluoride atmosphere. More specifically, a dopant solution is prepared by dissolving $Pr_6O_{11}$ in a nitric acid solution, typically 10 ml. concentrated nitric acid to 100 ml. distilled water, and then diluting the resulting solution with distilled water in a volumetric flask. For convenience, we prepared the dopant solutions with concentrations such that a 1–10 ml. aliguot contained the amount of dopant needed for a given preparation. About 0.02 moles of yttrium oxide ($Y_2O_3$) was added to a stirred, heated (~90° C) solution of about 10 ml. concentrated nitric acid in about 100 ml. of distilled water. An aliquot of the praseodymium-dopant solution was added so that the mole ratio of dopant ion to yttrium ion in solution was in accordance with the desired mole percentage (about 1%) of the praseodymium. p The oxide is dissolved to yield a clear solution and this is diluted to about 150 ml. with distilled water before heating to a boil. A hot (>90° C) solution of about 20 gms. of oxalic acid hydrate in about 150 ml. of distilled water is added to the boiling solution while the latter is stirred. After this addition, the heat source is removed and the stirring continued for about 3 hours. The oxalate is then collected by filtration from the mother liquor.

The mixed oxalates are transferred to a quartz boat and heated for about 45 minutes at approximately 800° under flowing oxygen (200 cc/min) to decompose. The oxides so obtained are transferred to an HF-resistant (e.g., platinum reaction boat and fired for about 3 hours at a temperature of approximately 1000° C in a flowing atmosphere of ultrahigh purity argon (800 cc/min) and hydrous hydrogen fluoride (400 cc/min). The temperature is increased to within 20° C of the melting point of the host fluoride (1152° C for $YF_3$) and the conversion allowed to proceed for an additional time interval of about 3 hours, to prepare an intermediate $YF_3$:$Pr^{3+}$ compound. We then ground together stoichiometric quantities of LiF, prefired at 950° C in an atmospheric of argon and HF, and the $YF_3$: $Pr^{3+}$ prepared as described hereinabove. A typical 4-gram mixture is fired for about 90 minutes in a platinum boat at about 750° C in a flowing Ar-HF (100 cc/min each) atmosphere. The fired mixture is then removed from the furnace, reground, and refired under the same conditions for an additional time interval of about 1 hour.

While the present invention has been described with reference to one preferred embodiment thereof, many variations and modifications will now become apparent to those skilled in the art. It is our intent, therefore, to be limited not by the scope of the specific disclosure herein, but only by the scope of the appending claims.

What is claimed is:

1. A fluorescent lamp comprising:
   envelope means for forming a substantially gas-tight enclosure;
   means contained within said envelope means for emitting radiation at at least wavelengths of about 185 nanometers and about 254 nanometers in the ultraviolet portion of the electromagnetic spectrum;
   a first phosphor layer fabricated upon an interior surface of said envelope means for converting at least the ultraviolet-wavelength radiations at about 254 nanometers to radiation in the visible portion of the electromagnetic spectrum, said first phosphor layer having the visible radiation output thereof subject to depreciation responsive to receipt of at least the 185 nanometer ultraviolet wavelength radiation; and a second phosphor layer, deposited upon the interior surface of said first phosphor layer, for absorbing a substantial quantity of the radiation at at least the 185 nanometer wavelength and converting the quanta thereof to radiation having wavelengths on the order of 220–260 nanometers and absorbable by said first phosphor layer for conversion thereof to visible radiation.

2. A fluorescent lamp as set forth in claim 1, wherein said second phosphor layer is fabricated of a trivalent-praesodymium-activated phosphor.

3. A fluorescent lamp as set forth in claim 1, wherein said second phosphor layer is fabricated with a density of between about 3 and about 4 milligrams per square centimeter.

4. A fluorescent lamp comprising:

envelope means for forming a substantially gas-tight enclosure;

means contained within said means for emitting radiation at at least two different wavelengths in the ultraviolet portion of the electromagnetic spectrum;

a first phosphor layer fabricated upon an interior surface of said envelope means for converting one of the ultraviolet-wavelength radiations to radiation in the visible portion of the electromagnetic spectrum, said first phosphor layer having the visible radiation output thereof subject to depreciation responsive to receipt of another ultraviolet wavelength radiation; and a second phosphor layer of trivalent-praesodymium-activated lithium yttrium tetrafluroide ($LiYF_4:Pr^{3+}$), deposited upon the interior surface of said first phosphor layer, for absorbing a substantial quantity of the radiation at said another ultraviolet wavelength and converting the quanta thereof to radiation having wavelengths absorbable by said first phosphor layer for conversion thereof to visible radiation.

5. A fluorescent lamp as set forth in claim 4, wherein the $LiYF_4$ host is activated by about 1% $Pr^{3+}$.

6. A fluorescent lamp as set forth in claim 5, wherein said second phosphor layer is fabricated with a density of between about 3 and 4 milligrams per square centimeter of $LiYF_4:1.0\%Pr^{3+}$.

* * * * *